(12) United States Patent
Korajda et al.

(10) Patent No.: US 7,801,639 B2
(45) Date of Patent: Sep. 21, 2010

(54) METHOD AND APPARATUS FOR OPERATING CONTROLLED MACHINES

(75) Inventors: Bartosz Korajda, Lohn am Main (DE); Sebastian Krauskopf, Gemuenden (DE)

(73) Assignee: Robert Bosch GmbH, Stuttgart (DE)

( * ) Notice: Subject to any disclaimer, the term of this patent is extended or adjusted under 35 U.S.C. 154(b) by 177 days.

(21) Appl. No.: 12/025,238

(22) Filed: Feb. 4, 2008

(65) Prior Publication Data

US 2008/0188976 A1 Aug. 7, 2008

(30) Foreign Application Priority Data

Feb. 5, 2007 (DE) .................. 10 2007 006 421

(51) Int. Cl.
*G06F 19/00* (2006.01)
(52) U.S. Cl. .................................... 700/193
(58) Field of Classification Search ......... 700/186–189, 700/193, 194
See application file for complete search history.

(56) References Cited

U.S. PATENT DOCUMENTS

| | | | |
|---|---|---|---|
| 6,366,045 | B1 | 4/2002 | Fahrbach et al. |
| 6,701,210 | B2 | 3/2004 | Heber et al. |
| 7,299,108 | B2 | 11/2007 | Geissdoerfer et al. |
| 2003/0078692 | A1 | 4/2003 | Heber et al. |
| 2006/0224932 | A1 | 10/2006 | Ruppel et al. |
| 2006/0287758 | A1 | 12/2006 | Geissdorfer et al. |

FOREIGN PATENT DOCUMENTS

| | | |
|---|---|---|
| DE | 43 23 831 | 2/1995 |
| DE | 100 27 864 | 12/2000 |
| DE | 199 34 044 | 1/2001 |
| DE | 103 21 970 | 12/2004 |
| DE | 10 2005 012 024 | 9/2006 |
| EP | 1 220 069 | 7/2002 |

OTHER PUBLICATIONS

Cheng et al. "Real-time NURBS command generators for CNC servo controllers"; 2002; Elsevier; Internationl Jounranl of Machine Tolls & Manufactruing; pp. 801-813.*
"SMC20 Motion Contoller"; May 1995; Eaton Hydraulics; Genral Product Support; Vickers; pp. 1-52.*
VDI 2143, Blatt 1, "Motion Rules for CAM Mechanisms Theoretical Fundamentals", Association of German Engineers, Oct. 1980.
VDI 2143, Blatt 2, "Motion Rules for CAM Mechanisms Practical Application", Association of German Engineers, Jan. 1987.

* cited by examiner

*Primary Examiner*—Albert DeCady
*Assistant Examiner*—Chad Rapp
(74) *Attorney, Agent, or Firm*—Michael J. Striker

(57) ABSTRACT

In a method for operating controlled machines, a motion of at least one movable machine element of the machine is controlled using a motion profile specific to that motion, and this motion profile of the motion of the machine element is subdivided into a plurality of profile segments. Each of the profile segments is assigned at least one motion condition which influences this profile segment, and each motion condition includes at least one tripping event and at least one action event associated with this tripping event and tripped by the tripping event, and the action event influences the applicable profile segment.

11 Claims, 2 Drawing Sheets

Trigger from SPS for jump condition

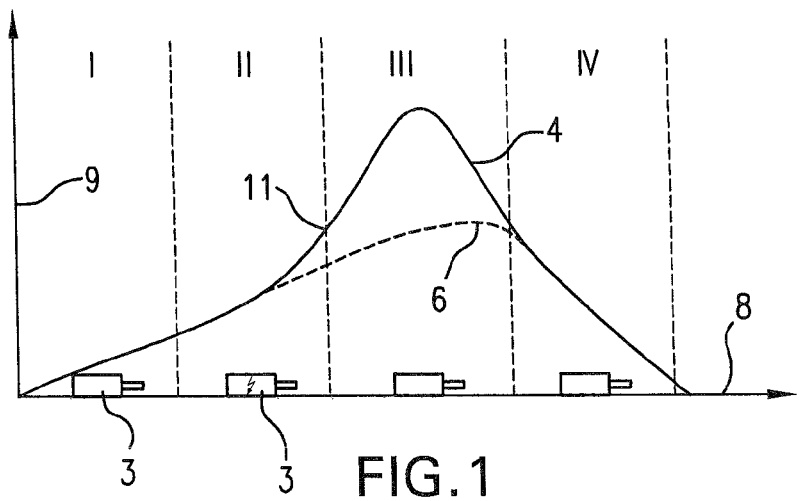
FIG.1
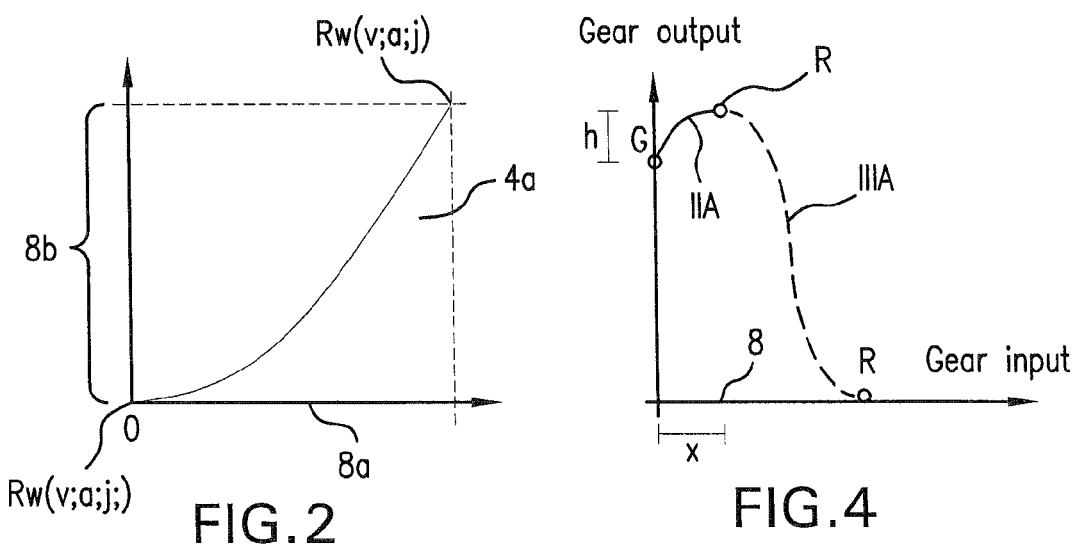
FIG.2
FIG.4
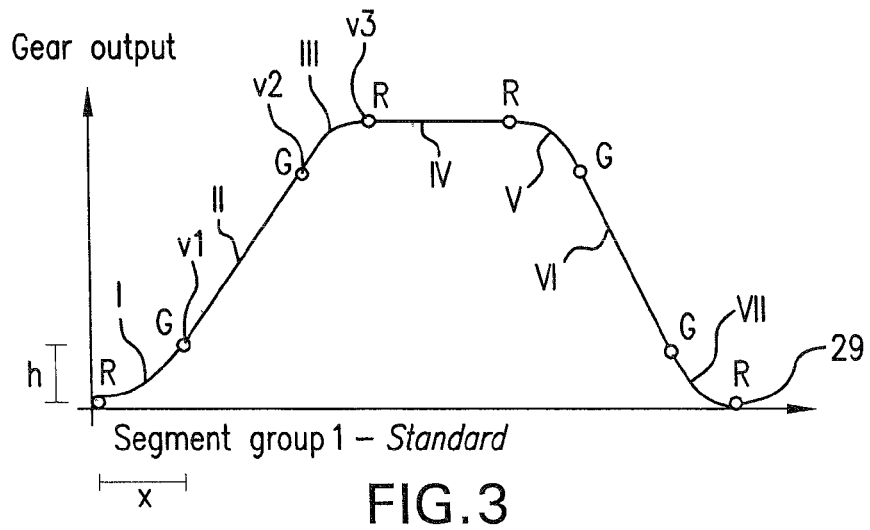
FIG.3

Trigger from SPS for jump condition

METHOD AND APPARATUS FOR OPERATING CONTROLLED MACHINES

CROSS-REFERENCE TO A RELATED APPLICATION

The invention described and claimed hereinbelow is also described in German Patent Application DE 10 2007 006 421.9 filed on Feb. 5, 2007. This German Patent Application, whose subject matter is incorporated here by reference, provides the basis for a claim of priority of invention under 35 U.S.C. 119(a)-(d).

BACKGROUND OF THE INVENTION

The present invention relates to a method for operating electronically controlled machines, in particular, and to a control device for operating controlled machines.

The method of the invention and the apparatus of the invention are described with respect to packaging machines, textile machines, and the like. However, it will be noted that the method and the apparatus can also be used for other kinds of machines, such as printing presses or automation systems. The invention is moreover suitable for electrically, hydraulically, or pneumatically controlled machines as well.

Such methods for operating machines have long been known in the prior art. Such controllers for instance make it possible to guide the motion of movable machine elements of these machines. These machine elements are controlled using a motion profile specific to the motion. In the prior art, it is known to describe suitable motion profiles or cam disks as a rigid path of motion that is traversed cyclically. For instance, DIN 21 43 (in which the cam disk is described as a rigid path of motion that is cyclically traversed) is based on such controllers.

In the method from the prior art, however, the course of the cam disk is merely cyclical and is fixedly defined from beginning to end. Any change in the path of motion is therefore possible only by manually switching to a different cam disk.

European Patent Disclosure EP 1 220 069 B1 describes a method for setting up flexible cam disk functions by way of a control or applications program. A cam disk function that describes a motion of a machine element is described in portions; successive motion portions are defined by segments or points, and between such motion portions, interpolation is done in accordance with a predeterminable interpolation rule. Commands for predetermining and inserting points, segments, and interpolation rules for the transit time are provided, and the cam disk function is set up by way of commands in the transit time system of a machine controller. At the same time, in EP 1 220 069 B1, a cyclical or rigid motion sequence is generated, and in particular no jumps in individual motion steps of the motion sequence are possible. The individual paths of motion are moreover only limitedly changeable.

SUMMARY OF THE INVENTION

It is therefore the object of the present invention to make a method for operating controlled machines available which on the one hand enables a flexible reaction to external operating conditions or in response to user specifications, and on the other hand permits a change in the sequence of the path of motion in reaction to such factors. In addition, the options for the user to change the path of motion are to be improved. More precisely, an event-controlled cam disk or an event-controlled motion profile with freely definable conditions is to be conceived of, and the motion guidance is thus to be improved.

In keeping with these objects and with others which will become apparent hereinafter, one feature of the present invention resides, briefly stated, in a method for operating control machines, comprising the steps of controlling a motion of at least one movable machine element of a machine using a motion profile specific to said motion; subdividing said motion profile of said motion of the machine into a plurality of profile segments; assigning at least one profile segment at least one motion condition which influences said at least one profile segment; including in each motion condition at least one tripping event and at least one action event associated with said tripping event and tripped by a trippable event; and influencing by the action event an applicable one of the profile segments.

Another feature of the present invention resides, briefly stated, in a control apparatus for operating control machines by controlling a motion of at least one movable machine element using a motion profile specific to the motion and subdivided into a plurality of profile segments, the control apparatus comprising a control device which causes at least one of the profile segments to be assigned at least one motion condition which influences the profile segments and includes at least one tripping event and at least one action event associated with the tripping event and tripped by a trippable event, with the action event influencing an applicable one of the profile segments.

In the method of the invention for operating controlled machines, in which a motion of at least one movable machine element of the machine is controlled using a motion profile specific to that motion, and this motion profile of the motion of the machine element is subdivided into a plurality of profile segments. According to the invention, each of the profile segments is assigned at least one motion condition which influences this profile segment. Each motion condition includes at least one tripping event and at least one action event associated with this tripping event and tripped by the trippable event, and the action event influences the applicable profile segment.

The term "motion condition" is thus understood to mean a combination of at least one tripping event and one action event associated with this tripping event. Preferably, each tripping event is assigned precisely one action event. Conversely, one action event can be assigned a plurality of tripping events. The term "profile segments" is understood to mean excerpts of the entire motion profile. Preferably, the individual profile segments are located in line with one another and in their entirety they produce the total motion profile of the motion of the machine element. Conditions can also be assigned to the entire motion profile or to a plurality of profile segments.

By the provision of motion conditions for the individual profile segments, direct influence on the segment is possible, and jumps from a certain profile segment to another profile segment are also possible. For instance, in the presence of a certain tripping event, a jump can be made from a third profile segment to a seventh profile segment.

Advantageously, the aforementioned conditions are monitored at the instant of execution and transacted in real time. The various path changes and changes in the motion profile that are tripped by the conditions are also recalculated in real time. In this way, a realtime-capable and event-controlled motion guidance is achieved, and fast, flexible adaptation of motion profiles to external events is possible. Also, as noted, jumps between the segments within one motion profile are possible, which leads to great path calculation flexibility and high user-friendliness, or in other words intuitive operation. A fast reaction to process events is also possible.

Preferably, by means of a tripping event, a change in at least one profile segment is accomplished. However, it is also possible by a tripping event to influence a plurality of profile segments. Tripping events may be various states or command variables.

The change in this profile segment is preferably calculated in real time, which enhances the flexibility of the method.

Advantageously, the calculation of the change in a profile segment or in the motion profile is performed by means of predetermined motion laws and especially preferably is done in real time. Motion laws define the regularity of gear input and gear output functions, for instance, and in general for the representation of motion profiles and thus define the course of the path. A law of motion is unambiguously defined in general by way of the parameters of stroke, master portion, or mathematically expressed the portion on an X axis for a function f(x), via peripheral values of the applicable segment, and turning point displacements. The peripheral values can each be represented by their parameters of velocity, acceleration and jerk, jerk being the derivation of the acceleration in accordance with time.

Examples of (standardized) transition functions are $n^{th}$ degree polynomials, in particular fifth- or seventh-degree polynomials; linear rest, modified acceleration trapezoids, and the like. In the context of this description, stroke is defined as a function of the master portion.

Moreover, via a selection of various (standardized) motion laws, a multiplicity of paths of motion can be defined. For instance, for the situation where at the beginning of a segment the applicable element is in repose, and the applicable element is also in repose (at rest) at the end of the segment, the portion in between can be described by means of linear rest (a distance or straight line), a simple sinoid (that is, a simple sine curve), an inclined sinoid (such as a Bestehorn sinoid), a sine curve inclined about an optimal acceleration, a sine curve inclined about an optimal torque, a Gutman sinoid, a modified sinoid, a modified acceleration trapezoid, or a fifth- or seventh-degree polynomial. Other motion laws are possible.

If a transition from a first velocity to a second velocity is to be made, then this is possible for instance by means of a linear interpolation, by fifth- or seventh-degree polynomials, by modified sinoids, by an acceleration-limited trapezoid, or the like.

As further motion laws for realtime calculation of the path, motion laws such as splines, point tables, freely selectable functions, and the like can be executed. Via the tripping events, various states of the various command variables and of the current motion step can be called up and linked.

Preferably, at least one basic function is the basis of the motion profile. This function described the unimpeded state, or a state without external events. This motion profile can also be preferably defined portion by portion. This basic function can also be selected from the above function classes. The present invention permits fast reactions to altered states that affect the basic function. For instance, the entire motion profile can be described by a fifth-degree polynomial. Upon the occurrence of an external event, it can for instance be brought about that a segment of this motion profile is changed, or that a motion within a certain segment is discontinued and continued in a further segment. Also preferably, individual profile segments are combined into segment groups, especially if the same conditions are applicable to the combined segments.

Advantageously, the tripping event or criterion is selected from a group of criteria which contains a position (of the machine element) relative to the beginning of a motion step, a position (of the machine segment) relative to the beginning of the motion profile, an input signal from an SPS, an input signal from an external input, a duration of execution, the result of a different condition, a formula setting, combinations of these, or the like. A certain motion step is described by a certain profile segment.

What this means for instance is that a certain absolute position of the machine element can be a tripping event, which in turn trips an action event. For instance, if the machine element upon a motion step is in a certain position, then by ascertainment of this position, the command can be issued to displace the machine element. The duration of execution is referred to the execution for an individual step of the motion profile, or for the entire motion profile. An overly long or overly short duration of execution compared to a set-point value can trip a certain action. Individual conditions can also be linked to one another, and for instance the result of a different condition, that is, in particular an executed reaction event, can in turn be the basis for a tripping event. A tripping criterion can also be a formula setting or conditions specified by the user.

Preferably, the reaction event is selected from a group of events which contains a discontinuation of a motion step, an immediate jump to a different motion step, a jump to a different motion step after the conclusion of the current motion step, the triggering of an SPS output or of an external output, the change of properties and peripheral conditions of the current motion step, combinations of these, and the like. Individual reaction events can be brought about in reaction to corresponding tripping criteria. For instance, if a tripping criterion is found to be present, then the action associated with this tripping criterion is performed.

The present invention is also directed to a control apparatus for operating controlled machines, in which a motion of at least one movable machine element of the machine is controlled using a motion profile specific to that motion. This motion profile is defined in terms of portions or segments. According to the invention, a control apparatus is provided which causes at least one of the profile segments, to which the motion profile is allocated is assigned at least one motion condition, which varies this profile segment, and each motion condition includes at least one tripping event and at least one action event, associated with this tripping event and trippable by the tripping event, and this action event influences the profile segment. Preferably, the control apparatus has a verification device, which verifies whether a certain tripping event has occurred. Preferably, at least one motion condition is assigned to each of the profile elements.

The control device also preferably assigned a certain action event to a certain tripping event. A callup link among various states of the various command variables is possible.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a graph illustrating possible changes in a motion profile;

FIG. 2 is a graph illustrating motion laws;

FIG. 3 is an illustration of a motion graph;

FIG. 4 is an illustration of a motion graph with a discontinuation condition;

DESCRIPTION OF THE PREFERRED EMBODIMENTS

Figure 5:
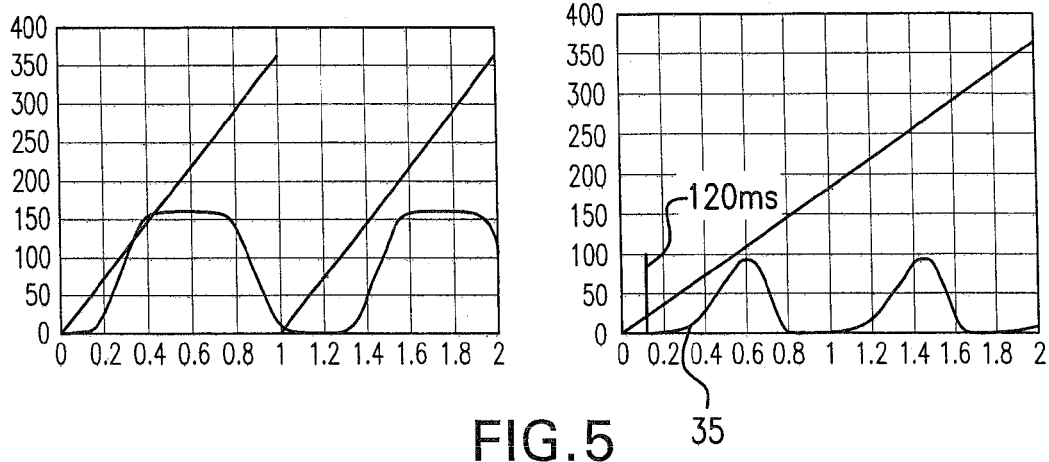
FIG. 5 shows a motion profile, with the inclusion of chronological conditions.

FIG. 1 shows a motion graph to illustrate the method of the invention. Reference numeral 8 refers to a slave axis position, and reference numeral 9 refers to a slave axis position. In mathematical terms, the slave axis position is a function f(x) that is determined by an x value plotted on the axis 8. Thus a motion profile 4 describes a motion of a machine element in the normal state. The motion profile 4 is subdivided into four portions or segments I-IV. Reference numeral 3 symbolizes a certain slave axis. In segment II, a condition occurs along with a jump command (action event). In response to this jump command, a new motion profile 6 is ascertained, which is illustrated by the dashed line. This deviates in the second segment II from the original motion profile 6, and at the transition between segment III and segment IV, it encounters the original motion profile 4 again.

Hence the action performed, in the present case, could be that the current motion step is immediately discontinued, and a jump is made to a different motion step, namely to segment IV. Along with the term "segment", the term "segment group" will also be used hereinafter. This expresses the fact that a plurality of segments can also be combined into one segment group.

The new path or new motion profile 6 is calculated here in such a way that no jumps, or in mathematical terms no kinks in the profile, occur. As a result, jerk-free motion of the corresponding machine element is possible. However, depending on the requirements for the machine, it would also be possible to calculate different paths or motion profiles. For calculating that path, various motion laws, explained below in detail, can be used.

In this way, as noted, jumps between segments within a motion profile are possible, and high flexibility in calculating paths is also assured. Hence process events can be reacted to quickly and in an especially user-friendly way.

Besides the action events shown, it would also be possible to change the properties or peripheral conditions of the current motion step, for instance the slave axis position at the slave axis position represented by reference numeral 11, or the corresponding slave axis position 12 itself. One skilled in the art will recognize that a very high number of different actions is conceivable, actions that in particular may depend also on the requirements of the machine controller or for instance on a product being handled by the machine.

FIG. 2 shows an illustration for the motion laws employed. In general, the motion laws define the regularity between a gear input function and a gear output function, or between a master portion and a corresponding slave axis portion and thus define the course of the path. In general, a motion law is determined by way of the parameters of stroke (slave axis portion $8b$), master portion $8a$, the peripheral values on the left-hand side of the portion, the peripheral values (Rw (v, a, j)) on the right-hand side of the portion, turning point displacements, and corresponding standardized transition functions between the peripheral values. The various descriptive parameters can in the present case be the velocities v, the accelerations a, and the jerk values j in the various peripheral regions. The term "jolt" is understood to mean the derivation of the acceleration in accordance with time. Reference $4a$ defines one portion of the motion profile 4.

Examples of standardized transition functions that can be considered are fifth-degree polynomials, a linear rest (transition from v=0 to v=0), modified sinoids, modified acceleration trapezoids, and many more.

As noted at the outset, it is possible for an entire motion profile 4 to be subdivided into different segments, and different transition functions and motion laws can be used for each segment. By a selection of various standardized motion laws, many motion profiles 4 or paths of motion can be defined.

Besides the transitions shown, point tables, zero-degree interpolations, linear interpolations, or cubic spline interpolations may be employed.

FIG. 3 shows a motion graph or motion profile that is composed of a plurality of portions, in this case a total of seven portions. The abbreviation R in each case means rest, and the abbreviation G in each case means velocity. The portions or profile segments are identified by the reference numerals I-VII. In the first portion, a transition R->G is taking place, that is, a transition from a velocity v=0 to a certain final velocity v1. At the same time, a certain gear output or a stroke Δh is traversed, and on the slave axis 8 a certain slave axis segment Δx is also traversed. The portion I is described here by a modified sinoid.

In the second portion II, acceleration takes place at constant acceleration from the first velocity v1 to a second velocity v2, so that in this case a linear representation is possible (transition G->G). In the third portion III, the velocity v2 changes to a maximum velocity v3, and in this case a modified sinoid is again employed as the law of motion, in order to avoid kinks in the motion profile (transition G->R). In segment IV, the velocity v3, so that this segment can be described by a linear rest (transition R->R). Accordingly, no change in stroke occurs here either, since both the initial and the final velocity v, in this segment IV, is 0. In the fifth segment V, once again a modified sinoid is used as the motion law; in the right-hand segment VI (G->G), there is a linear representation, and in the seventh segment VII, to arrive from a velocity to a position of repose, a modified sinoid is again employed.

With reference to FIG. 4, it will be explained how with the aid of a condition, the segment II in FIG. 3, that is, linear synchronous travel, could be discontinued, in particular in a time-controlled way. It should be noted that in the prior art, the possibility also exists of controlling individual segments not as a function of the slave axis but rather as a function of time control.

In FIG. 4, reference numeral IIA refers to a first portion of the segment II shown in FIG. 3. In a first step, a second segment group is defined which is to be jumped to by means of the later condition. This is the position of repose, that is, the end point 29 shown in FIG. 3. However, different segment groups or points could be selected instead. Hence this second segment group is jumped to as a result of the later condition and can thus be defined as a discontinuation curve.

In order in FIG. 4 to proceed from point G to the upper point R, a fifth-order polynomial is used as the law of motion. A stroke Δh is traversed, and a master portion Δx. The transition from the upper point R to the lower point R is likewise described with a fifth-order polynomial, and during this segment, the slave axis position 0° is always approached. As the master, the slave axis 8 is used here in each case.

Moreover, a chronological operator may be employed in addition. It is possible to append to the segment group IIA shown in FIG. 4 a condition that is intended to trip a jump to the segment I (FIG. 3) or the segment IIIA as soon as a predetermined time, for instance, such as 120 milliseconds, has elapsed.

Preferably, intermediate segments with an absolute slave axis target position specification can be appended, which assure that at the end of the segment IIIA in FIG. 4, the slave axis is again at the 0° position, regardless of the slave axis position at the beginning of that segment. Thus preferably within segment group IIIA, the slave axis position of 0° is always approached. Also, once again preferably the segment group I or segment I, not shown in FIG. 4 but shown in FIG. 3, is again defined as the slave segment for this segment group IIIA.

Thus not only a tripping event, such as the attainment of a relative master position, but also a chronological operator, such as the passage of 120 milliseconds at a further master, or in other words an instant or a period of time, is the basis. The action to be performed then comprises immediately discontinuing the current segment; for that purpose, a certain segment that describes the discontinuation is used. More precisely, this segment is the target segment that is to be approached once again.

With the addition of additional chronological conditions, a distinction can for instance be made in accordance with different slave axis velocities. If in the above example a segment is discontinued after 120 milliseconds, this condition does not pertain in the case of the left-hand segment shown in FIG. 5, so that in this case the motion profile remains unchanged. However, if the velocity of the slave axis is reduced, as shown in the right-hand portion of FIG. 5 (half velocity), then the corresponding segment is discontinued after precisely 120 milliseconds and a jump is made to the segment group 35, which describes the discontinuation. Thus chronological conditions can also be inserted, such as the question when a certain set-point state has been attained after a period of time intended for it.

Figure 6:
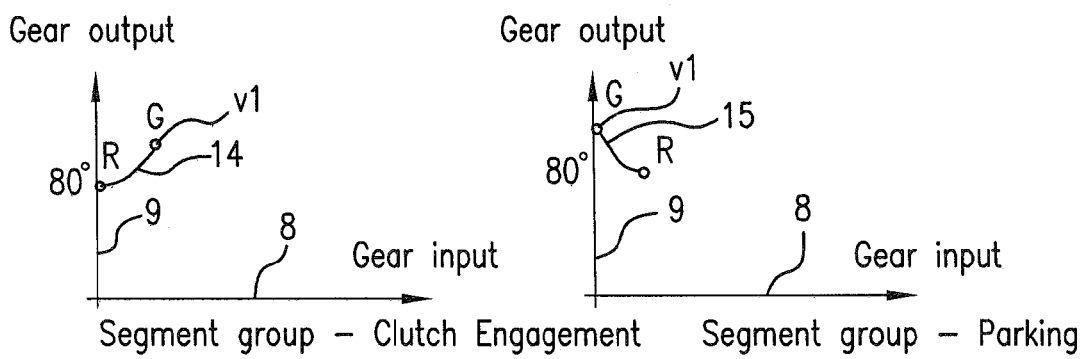
FIG. 6 shows two further action events.

FIG. 6 shows a further example for a jump condition. The left-hand portion shows a segment group 14 or segment for clutch engagement, and the right-hand portion shows a segment group 15 for parking. In the case of the left-hand portion of the drawing, a displacement is made from a resting position R, that is, at velocity v=0, to a final velocity v at point G. As the motion law, once again a fifth-order polynomial is used, and as the master, the slave axis 8 is used in both cases. In the case of the right portion of the drawing, from a predetermined velocity, a position of repose is approached and thus a parking position is assumed. Once again, the motion law is a fifth-order polynomial. The two segment groups, which as noted are to be used for engagement and disengagement from the above-described standard profile expand the overall possibilities shown. The slave axis position of 80° shown can be considered here to be a "parking position".

Further conditions may for instance be jumps from one segment, or one segment group (standard), to a further segment group, "discontinuation" as a consequence of a set SPS input. Accordingly, the tripping torque here is a triggered SPS variable, for instance. As soon as the operator ascertains the presence of this event, he initiates a jump to a further segment, such as a new approach segment, after the current segment is terminated.

Figure 7:
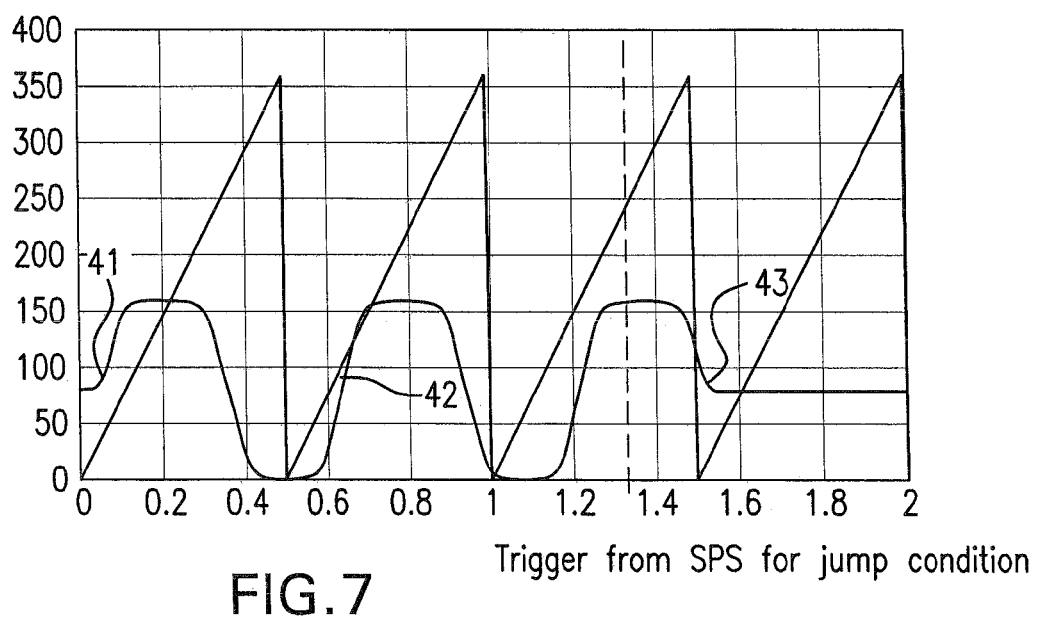
FIG. 7 is a further illustration of a motion profile.

FIG. 7 shows a further example for a jump condition. Here, the motion profile is started with a segment group 41 that is characteristic for engagement, and a transition is then made to the standard segment group 42. At a later time, an SPS tripper, for instance, is set to "true"; that is, a certain tripping event ensues. As a consequence, a jump condition is tripped, and a jump is made to the segment group 43 that is characteristic for parking. The execution of the motion profile ends here.

It will be understood that each of the elements described above, or two or more together, may also find a useful application in other types of methods and constructions differing from the type described above.

While the invention has been illustrated and described as embodied in a method and apparatus for operating controlling machines, it is not intended to be limited to the details shown, since various modifications and structural changes may be made without departing in any way from the spirit of the present invention.

Without further analysis, the foregoing will so fully reveal the gist of the present invention that others can, be applying current knowledge, readily adapt it for various applications without omitting features that, from the standpoint of prior art, fairly constitute essential characteristics of the generic or specific aspects of this invention.

The invention claimed is:

1. A method for operating controlled machines, comprising the steps of:
   controlling a motion of at least one movable machine element of a machine using a motion profile specific to said motion;
   subdividing said motion profile of said motion of the machine into a plurality of profile segments;
   assigning at least one profile segment to at least one motion condition which influences said at least one profile segment, wherein said at least one motion condition is monitored at an instant of execution;
   assigning to said at least one motion condition at least one tripping event and at least one action event associated with said tripping event and tripped by a trippable event, wherein the at least one action event influences the at least one profile segment, such that the at least one moveable machine element follows said motion profile in a substantially jerk-free motion; and
   jumping between said profile segments by means of the least one motion condition, wherein a jump between said profile segments is initiated by a jump command, and wherein in response to said jump command, a new motion profile is ascertained.

2. The method as defined in claim 1; and further comprising transacting the at least one motion condition in real time.

3. The method as defined in claim 1; and further comprising effecting a change in the profile segment by the at least one tripping event.

4. The method as defined in claim 3, wherein said effecting a change includes calculating the change in the profile segment in real time.

5. The method as defined in claim 4, wherein said calculating of the change of the profile segment includes performing a calculation by predetermined motion laws.

6. The method as defined in claim 1; and further comprising selecting a basis of the motion profile as at least one basic function.

7. The method as defined in claim 1; and further comprising selecting a tripping criterion from a group of criteria consisting of a position of the machine element relative to a beginning of a motion step, a position of the machine element relative to a beginning of a motion condition, an input signal from a Standard Positioning System (SPS), an input signal from an external input, a duration of execution a result of another condition, and combinations thereof.

8. The method as defined in claim 1; and further comprising selecting a reaction event from a group of events consisting of a discontinuation of a motion step, an immediate jump to a different motion step, a jump to a different motion step after a conclusion of a current motion step, a triggering of an SPS output or of an external output, a change of properties and peripheral conditions of a current motion step, and combinations thereof.

9. A control apparatus for operating controlled machines by controlling a motion of at least one movable machine element using a motion profile specific to the motion and subdivided into a plurality of profile segments, the control apparatus comprising:

a control device which causes at least one of the profile segments to be assigned at least one motion condition which influences the profile segments and includes at least one tripping event and at least one action event associated with the tripping event and tripped by a trippable event, wherein said at least one action event is adapted to influence the at least one profile segment, such that the at least one moveable machine element follows said motion profile in a substantially jerk-free motion, wherein said control device is configured to perform jumps between said profile segments by means of the at least one motion condition, wherein a jump between said profile segments is initiated by a jump command, and wherein in response to said jump command, a new motion profile is ascertained.

10. The control apparatus as defined in claim 9; and further comprising a verification device which verifies whether a certain tripping event has occurred.

11. The control apparatus as defined in claim 9, wherein said control device is configured so that it assigns a certain tripping event to a certain action event.

* * * * *